United States Patent
Rudrapatna et al.

(10) Patent No.: US 10,900,377 B2
(45) Date of Patent: Jan. 26, 2021

(54) SYSTEM AND METHOD FOR MONITORING FOR SAND PLUGGING IN GAS TURBINE ENGINES

(71) Applicant: HONEYWELL INTERNATIONAL INC., Morris Plains, NJ (US)

(72) Inventors: Nagaraja S. Rudrapatna, Chandler, AZ (US); Harry Lester Kington, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 297 days.

(21) Appl. No.: 15/959,654

(22) Filed: Apr. 23, 2018

(65) Prior Publication Data

US 2019/0323377 A1    Oct. 24, 2019

(51) Int. Cl.
  *F01D 21/10* (2006.01)
  *F01D 21/00* (2006.01)

(52) U.S. Cl.
  CPC .......... *F01D 21/10* (2013.01); *F01D 21/003* (2013.01); *F05D 2220/32* (2013.01); *F05D 2240/35* (2013.01); *F05D 2260/20* (2013.01); *F05D 2270/303* (2013.01); *F05D 2270/3011* (2013.01); *F05D 2270/3015* (2013.01)

(58) Field of Classification Search
  CPC ...... F01D 21/10; F01D 21/003; F01D 17/085; F05D 2270/303; F05D 2270/3015; F05D 2270/3011; F05D 2260/20; F05D 2240/35; F05D 2220/32; F05D 2260/607; F23N 5/242; F23R 3/06
  USPC ..................................................... 701/1, 100
  See application file for complete search history.

(56) References Cited

U.S. PATENT DOCUMENTS

| | | | | |
|---|---|---|---|---|
| 4,462,204 A | * | 7/1984 | Hull | F01D 25/12 415/115 |
| 4,896,510 A | * | 1/1990 | Foltz | F23M 5/085 60/757 |
| 5,575,858 A | * | 11/1996 | Chen | C23G 1/14 134/22.19 |
| 6,238,183 B1 | * | 5/2001 | Williamson | F01D 5/189 416/96 A |
| 6,408,610 B1 | * | 6/2002 | Caldwell | C23C 14/046 29/889.2 |
| 8,204,671 B2 | | 6/2012 | Agrawal et al. | |
| 9,599,527 B2 | | 3/2017 | Claussen et al. | |

(Continued)

FOREIGN PATENT DOCUMENTS

DE    102010001485 A1    8/2011
EP        0256845 A2    2/1988
(Continued)

OTHER PUBLICATIONS

Cardwell et al, Investigation of Sand Blocking Within Impingement and Film-Cooling Holes, ASME, Apr. 2010, Journal of Turbo Machinery, vol. 132, pp. 1-10 (Year: 2010).*

*Primary Examiner* — Jaime Figueroa
(74) *Attorney, Agent, or Firm* — Lorenz & Kopf, LLP

(57) ABSTRACT

A system and method of monitoring for sand plugging in a gas turbine engine includes sensing differential pressure across a combustor during engine operation. The sensed differential pressure is processed to determine an amount of sand plugging of combustor cooling holes, and an alert is generated when the amount of sand plugging exceeds a predetermined threshold.

18 Claims, 3 Drawing Sheets

(56) References Cited

U.S. PATENT DOCUMENTS

| | | | |
|---|---|---|---|
| 9,932,854 B1* | 4/2018 | Tibbetts | C11D 1/10 |
| 9,988,936 B2* | 6/2018 | Nasr | F01D 9/04 |
| 2006/0263216 A1* | 11/2006 | Brummel | F01D 5/189 |
| | | | 416/61 |
| 2007/0077144 A1* | 4/2007 | Lee | F01D 5/187 |
| | | | 416/193 A |
| 2008/0016971 A1 | 1/2008 | Bunce et al. | |
| 2008/0281562 A1* | 11/2008 | Chou | G01M 9/065 |
| | | | 703/1 |
| 2009/0155088 A1* | 6/2009 | Lee | F01D 5/188 |
| | | | 416/90 R |
| 2012/0070266 A1* | 3/2012 | Schaberg | F01D 21/12 |
| | | | 415/1 |
| 2013/0220004 A1* | 8/2013 | Epstein | G01M 15/14 |
| | | | 73/112.01 |
| 2015/0033836 A1* | 2/2015 | McCaldon | G01M 15/14 |
| | | | 73/112.01 |
| 2015/0354461 A1* | 12/2015 | Meier | F02C 7/052 |
| | | | 60/726 |
| 2016/0025596 A1* | 1/2016 | Heda | G05B 23/0232 |
| | | | 73/112.06 |
| 2016/0032835 A1* | 2/2016 | Lutjen | F01D 11/12 |
| | | | 60/39.092 |
| 2016/0061451 A1* | 3/2016 | Dudebout | F23R 3/06 |
| | | | 60/806 |
| 2016/0237902 A1* | 8/2016 | Zhang | F02C 7/143 |
| 2017/0107852 A1* | 4/2017 | Nasr | F01D 9/04 |
| 2017/0138263 A1* | 5/2017 | Duge | B03C 3/0175 |
| 2017/0298836 A1* | 10/2017 | Tiwari | F04D 27/001 |
| 2018/0023595 A1* | 1/2018 | Mook | B01D 45/12 |
| | | | 415/1 |
| 2018/0355801 A1* | 12/2018 | Kington | F02C 7/18 |
| 2019/0032508 A1* | 1/2019 | Wang | H04N 5/332 |
| 2019/0128183 A1* | 5/2019 | Morii | F02C 3/28 |

FOREIGN PATENT DOCUMENTS

| | | |
|---|---|---|
| EP | 1174587 A2 | 1/2002 |
| EP | 2833071 A2 | 2/2015 |

* cited by examiner

SYSTEM AND METHOD FOR MONITORING FOR SAND PLUGGING IN GAS TURBINE ENGINES

TECHNICAL FIELD

The present invention generally relates to gas turbine engines, and more particularly relates to a system and method for monitoring for sand plugging in gas turbine engines.

BACKGROUND

Significant progress in laser hole drilling technology has enabled conventional combustors to successfully employ effusion cooling. Effusion cooling involves drilling relatively large numbers of small diameter holes at relatively shallow angles to the surface of the combustor to provide a cooling film on the hot side surface. Cooling air flowing through these effusion cooling holes extracts heat from the combustor liner wall and helps protect it from high combustion gas temperature.

Unfortunately, there are also some unintended consequence associated with effusion cooling holes. For example, the effusion cooling holes are susceptible to plugging by environmental contaminants, such as fine sand particles in a dusty environment. This is particularly true for gas turbine engines operating in, for example, desert environments. Such sand plugging of gas turbine hot section components, such as the combustor and/or the turbine, causes premature/unscheduled removal of the engines. This, in turn, results in increases in ownership costs for customers and/or substantial increases in warranty costs for suppliers. Further, there is a need to minimize hot section distress of engines and APU's associated with sand plugging.

There is very little understanding of the mechanisms associated with sand plugging of cooling holes in a gas turbine engine. The data that is currently available is gathered by observing the plugged-up engine hardware. Although it shows the impact of sand plugging and final condition of the distressed hardware, there is very little data that can be interpreted/understood in terms of events and/or mechanisms contributing to it. To successfully develop mitigation strategies, it is necessary to understand the different mechanisms that contribute to plugging.

Hence, there is a need for a system and method for monitoring for sand plugging in a gas turbine engine that will prevent, or at least inhibit, premature/unscheduled removal of the engines.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for monitoring for sand plugging in a gas turbine engine includes a differential pressure sensor and a processor. The differential pressure sensor is configured to (i) sense differential pressure across a combustor during gas turbine engine operation and (ii) supply a differential pressure signal representative thereof. The processor is coupled to receive the differential pressure signal from the differential pressure sensor and is configured, upon receipt thereof, to determine an amount of sand plugging of combustor cooling holes.

In another embodiment, a gas turbine engine system includes a gas turbine engine, a differential pressure sensor, and a processor. The gas turbine engine includes a compressor, a combustor, and a turbine disposed in within a turbine housing. The combustor is disposed downstream of the compressor and defines a combustor inlet plenum. The combustor includes a combustion chamber and a plurality of combustor cooling holes that provide fluid communication between the combustor inlet plenum and the combustion chamber. The differential pressure sensor is coupled to the combustor and is configured to (i) sense differential pressure between the combustor inlet plenum and the combustion chamber and (ii) supply a differential pressure signal representative thereof. The processor is coupled to receive the differential pressure signal from the differential pressure sensor and is configured, upon receipt thereof, to determine an amount of sand plugging of the combustor cooling holes.

In yet another embodiment, a method of monitoring for sand plugging in a gas turbine engine includes sensing differential pressure across a combustor during engine operation, processing the sensed differential pressure in a processor to determine an amount of sand plugging of combustor cooling holes, and generating an alert, using the processor, when the amount of sand plugging exceeds a predetermined threshold.

Furthermore, other desirable features and characteristics of the system and method for monitoring for sand plugging in a gas turbine engine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
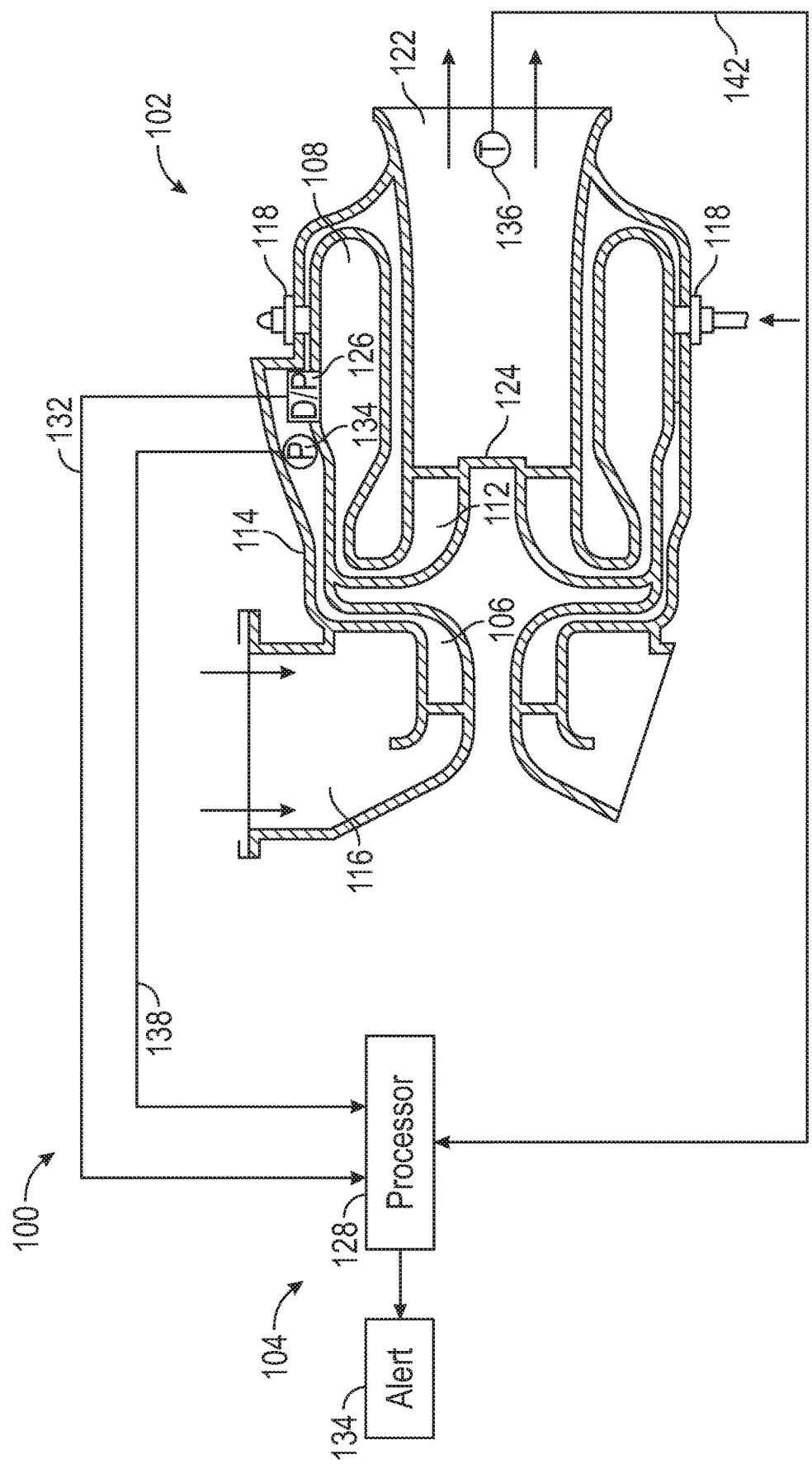
FIG. 1 depicts a simplified schematic diagram of a gas turbine engine system.

Referring first to FIG. 1, a simplified schematic diagram of a gas turbine engine system 100 is depicted. The depicted system 100 includes a gas turbine engine 102 and a sand plugging monitor system 104. The gas turbine engine 102, at least in the depicted embodiment, is configured as an auxiliary power unit (APU). It will be appreciated, however, that the gas turbine engine 100 may, in other embodiments, be configured as a propulsion engine, or as any one of numerous other devices implemented using a gas turbine engine.

The gas turbine engine 102 includes at least a compressor 106, a combustor 108, and a turbine 112, all of which are disposed in within a turbine housing 114. As is generally known, air is directed into the compressor 106 via an air inlet 116. The compressor 106 raises the pressure of the air and supplies compressed air to at least the combustor 108. In some embodiments, the compressed air may also be supplied to a non-illustrated bleed air outlet port. In the combustor 108, the compressed air is mixed with fuel that is supplied to the combustor 108 from a non-illustrated fuel source via a plurality of fuel nozzles 118. The fuel/air mixture is combusted, generating high-energy gas, which is then directed into the turbine 112.

The high-energy gas expands through the turbine 112, where it gives up much of its energy and causes the turbine 112 to rotate. The gas is then exhausted from the gas turbine engine 100 via an exhaust gas outlet 122. As the turbine 112 rotates, it drives, via a turbine shaft 124, various types of equipment that may be mounted in, or coupled to, the gas turbine engine 100. For example, in the depicted embodiment the turbine 112 drives the compressor 106. It will be appreciated that the turbine 112 may also be used to drive a generator and/or a load compressor and/or other rotational equipment, which are not shown in FIG. 1 for ease of illustration.

Figure 2:
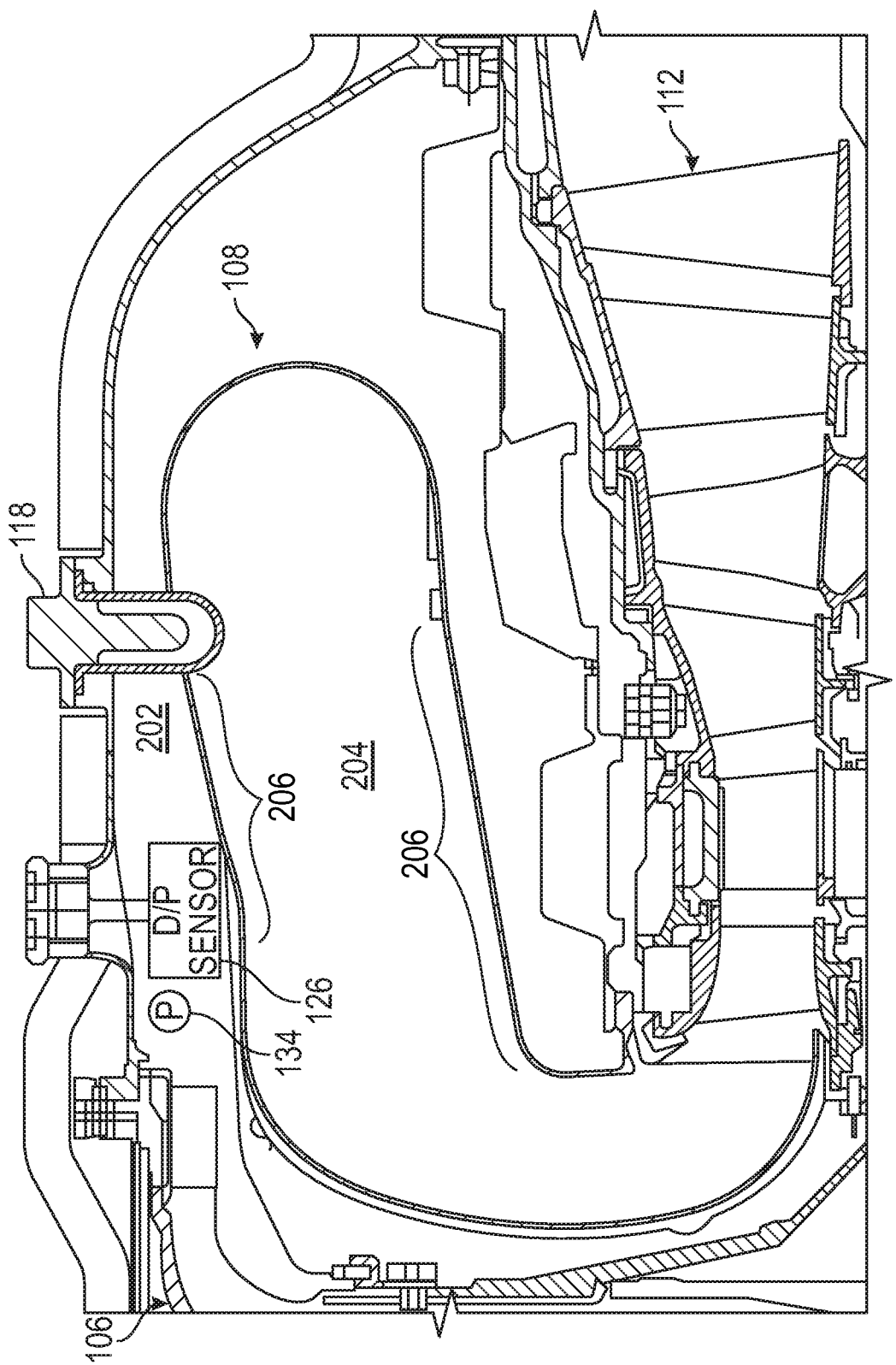
FIG. 2 depicts a close-up cross section view of one exemplary embodiment of a portion of the combustor section of the gas turbine engine depicted in FIG. 1.

As shown more clearly in FIG. 2, the combustor 108 is disposed downstream of the compressor 106, and defines a combustor inlet plenum 202. The combustor 108 includes a combustion chamber 204 and a plurality of combustor cooling holes 206 (e.g., effusion cooling holes). The combustor cooling holes 206 provide fluid communication between the combustor inlet plenum 202 and the combustion chamber 204. As was previously noted, the combustor cooling holes 206 are susceptible to plugging by environmental contaminants, such as fine sand particles. Thus, as also previously noted, the gas turbine engine system 100 additionally includes the sand plugging monitor system 104.

With reference back to FIG. 1, the sand plugging monitor system 104 includes at least a differential pressure sensor 126 and a processor 128. The differential pressure sensor 126, as FIGS. 1 and 2 both depict, is coupled to the combustor 108, and is configured to sense the differential pressure between the combustor inlet plenum 202 and the combustion chamber 204. The differential pressure sensor 126 is additionally configured to supply a differential pressure signal 132 representative of the sensed differential pressure to the processor 128.

Before proceeding, it should be noted that although the depicted differential pressure sensor 126 is implemented using a single differential pressure sensing device, in other embodiments, the differential pressure sensor 126 may be implemented using two absolute pressure sensors—one that senses pressure in the combustor inlet plenum 202, and one that senses pressure in the combustion chamber 204—from which the processor 128 could determine the differential pressure. Preferably, however, a single differential pressure sensor is used due to the relatively greater accuracy associated with such sensor devices.

Returning now to the description, the processor 128 is coupled to receive the differential pressure signal 132 from the differential pressure sensor 126. The processor 128 is configured, upon receipt of the differential pressure signal 132, to determine an amount of sand plugging of the combustor cooling holes 206. It will be appreciated that the processor 128 may receive the differential pressure signal via a wired or wireless connection. In one particular embodiment, the processor 128 is disposed remote from the gas turbine engine 102, and thus receives the differential pressure signal 132 via a wireless connection. In such embodiments, the differential pressure signal 132 may be supplied continuously, in real-time, or it may be supplied at a set periodicity, or it may be supplied after gas turbine engine operation.

Figure 3:
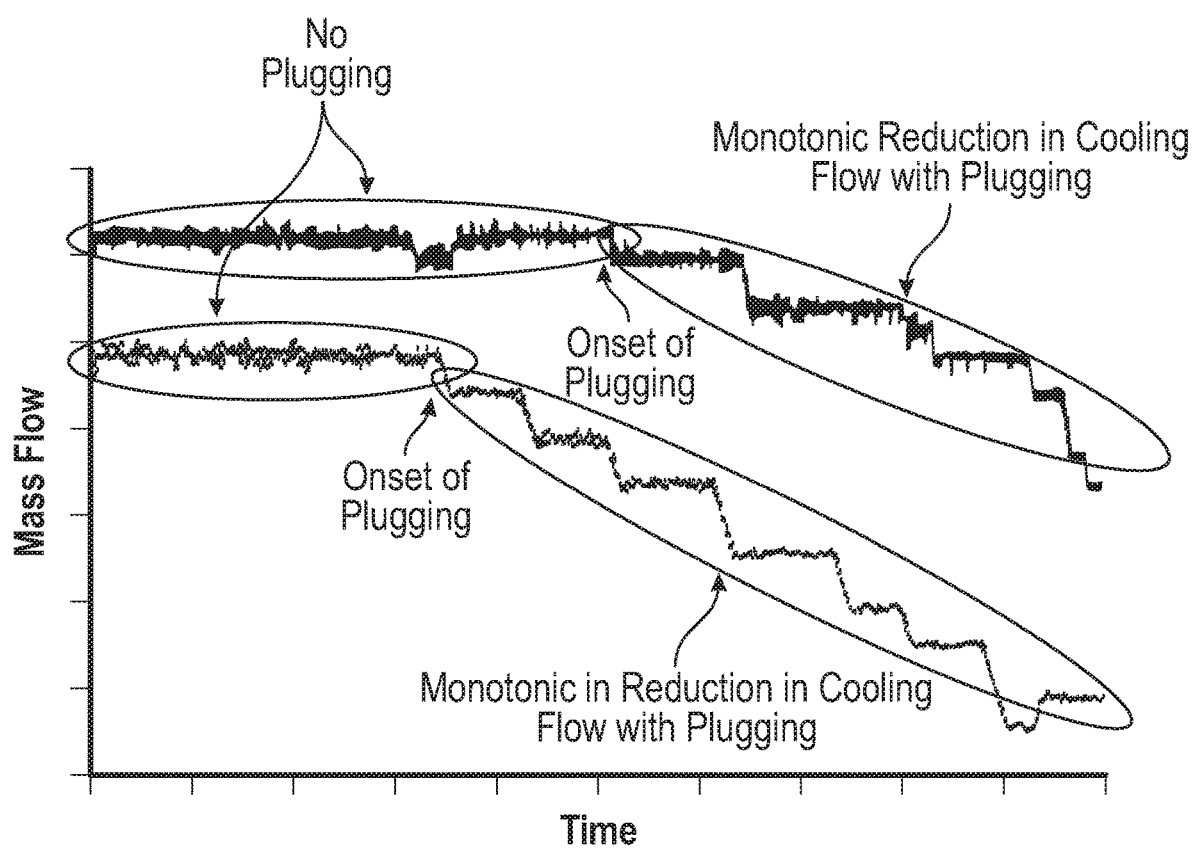
FIG. 3 graphically depicts the effects of sand plugging on flow through combustor cooling holes.

Regardless of how or when the processor 128 receives the differential pressure signal 132, it is noted that laboratory tests show that sand plugging causes a reduction in flow through the combustor cooling holes 206. More specifically, and as shown more clearly in FIG. 3, when there is no (or very little) plugging of the combustor cooling holes 206, flow through the combustor cooling holes is relatively constant. However, at the onset of sand plugging, flow begins decreasing monotonically as the sand accumulates. As may be appreciated, decreased flow through the combustor cooling holes 206 will result in increased combustor pressure drop; that is, an increase in differential pressure between the combustor inlet plenum 202 and the combustion chamber 204. The processor 128 is thus configured to correlate the sensed differential pressure (i.e., combustor pressure drop) to the amount of sand plugging of the combustor cooling holes 206.

Returning now to FIGS. 1 and 2, it is seen that the sand plugging monitor system 104 may also, in at least some embodiments, include additional sensors. In particular, the system 104 may additionally include a pressure sensor 134 and a temperature sensor 136. The pressure sensor 134, when included, is disposed within the combustor inlet plenum 202, and is configured to sense combustor inlet pressure and supply an inlet pressure signal 138 representative thereof to the processor 128. The processor 128 is further configured, upon receipt of the inlet pressure signal 138, to correct the sensed differential pressure based on the sensed inlet pressure, thereby providing increased accuracy.

The temperature sensor 136, when included, is configured to sense gas turbine engine exit temperature and to supply a temperature signal 142 representative thereof to the processor 128. As may be appreciated, sand plugging of the combustor cooling holes leads to, as just noted, reduced air flow through the engine 102. This causes increased temperatures within the engine 100, which leads to thermal distress of engine components, thereby adversely impacting turbine engine component health. The processor 128 is thus configured, upon receipt of the temperature signal 142, to assess turbine engine component health, based on both the sensed differential pressure and the sensed exit temperature.

The processor 128 may also be configured, at least in some embodiments, to generate an alert signal when the amount of sand plugging exceeds a predetermined threshold. To this end, the sand plugging monitor system 104 may also, in some embodiments, include an alert device 134. The alert device 134, when included, is coupled to receive the alert signal and is configured, upon receipt thereof, to generate an alert. It will be appreciated that the alert device 134, when included, may be configured to generate one or more types of alerts. For example, it may be configured to generate one or more of an audible alert, a visual alert, or a haptic alert. The alert device 134, when included, may be collocated with the other portions of the system 100, or it may be disposed remote therefrom. If it is disposed remotely, the processor 128 is preferably configured to transmit the alert signal, preferably wirelessly, to the alert device 134.

The sand plugging monitoring system 104 described herein allows the amount of sand plugging of combustor cooling holes to be determined. It does so by relating increased pressure drop across the combustor to combustor cooling hole plugging. The system 104 additionally correlates the pressure drop and engine exit temperature to gas turbine engine component condition/health. Thus, the potential thermal distress of components can be reduced or eliminated before the components are excessively distressed. Since plugging is an event or environment driven phenomena, a sudden change in these phenomena, such as dust storms and its impact on hot section components can be immediately assessed.

In one embodiment, a system for monitoring for sand plugging in a gas turbine engine includes a differential pressure sensor and a processor. The differential pressure sensor is configured to (i) sense differential pressure across a combustor during gas turbine engine operation and (ii) supply a differential pressure signal representative thereof. The processor is coupled to receive the differential pressure signal from the differential pressure sensor and is configured, upon receipt thereof, to determine an amount of sand plugging of combustor cooling holes.

These aspects and other embodiments may include one or more of the following features. A pressure sensor may be configured to sense combustor inlet pressure and supply an inlet pressure signal representative thereof, wherein the processor may be further coupled to receive the inlet pressure signal and may be further configured to correct the sensed differential pressure based on the sensed inlet pressure. A temperature sensor may be configured to sense (i) exit temperature of a gas turbine engine during gas turbine engine operation and (ii) supply a temperature signal representative thereof, wherein the processor may be further coupled to receive the temperature signal and may be further configured, upon receipt thereof, to assess gas turbine engine component health based on the sensed differential pressure and the sensed exit temperature. The processor may be further configured to generate an alert signal when the amount of sand plugging exceeds a predetermined threshold. An alert device may be coupled to receive the alert signal and configured, upon receipt thereof, to generate an alert. The alert device may be configured to generate one or more of an audible alert, a visual alert, and a haptic alert. The processor may be further configured to transmit the amount of sand plugging of the combustor cooling holes to a remote device.

In another embodiment, a gas turbine engine system includes a gas turbine engine, a differential pressure sensor, and a processor. The gas turbine engine includes a compressor, a combustor, and a turbine disposed in within a turbine housing. The combustor is disposed downstream of the compressor and defines a combustor inlet plenum. The combustor includes a combustion chamber and a plurality of combustor cooling holes that provide fluid communication between the combustor inlet plenum and the combustion chamber. The differential pressure sensor is coupled to the combustor and is configured to (i) sense differential pressure between the combustor inlet plenum and the combustion chamber and (ii) supply a differential pressure signal representative thereof. The processor is coupled to receive the differential pressure signal from the differential pressure sensor and is configured, upon receipt thereof, to determine an amount of sand plugging of the combustor cooling holes.

These aspects and other embodiments may include one or more of the following features. A pressure sensor may be configured to sense combustor inlet pressure and supply an inlet pressure signal representative thereof, wherein the processor may be further coupled to receive the inlet pressure signal and may be further configured to correct the sensed differential pressure based on the sensed inlet pressure. A temperature sensor may be configured to sense (i) exit temperature of a gas turbine engine during gas turbine engine operation and (ii) supply a temperature signal representative thereof, wherein the processor may be further coupled to receive the temperature signal and may be further configured, upon receipt thereof, to assess gas turbine engine component health based on the sensed differential pressure and the sensed exit temperature. The processor may be further configured to generate an alert signal when the amount of sand plugging exceeds a predetermined threshold. An alert device may be coupled to receive the alert signal and configured, upon receipt thereof, to generate an alert. The alert device may be configured to generate one or more of an audible alert, a visual alert, and a haptic alert. The processor may be further configured to transmit the amount of sand plugging of the combustor cooling holes to a remote device.

In yet another embodiment, a method of monitoring for sand plugging in a gas turbine engine includes sensing differential pressure across a combustor during engine operation, processing the sensed differential pressure in a processor to determine an amount of sand plugging of combustor cooling holes, and generating an alert, using the processor, when the amount of sand plugging exceeds a predetermined threshold.

These aspects and other embodiments may include one or more of the following features. The step of sensing differential pressure may include sensing the differential pressure between an inlet of the combustor and inside the combustor. The method may include sensing inlet pressure at an inlet of the combustor, and correcting the sensed differential pressure based on the sensed inlet pressure. The method may include sensing exit temperature of the gas turbine engine during gas turbine engine operation, and assessing gas turbine engine component health based on the sensed differential pressure and the sensed exit temperature.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for monitoring for sand plugging in a gas turbine engine, the system comprising:
    a differential pressure sensor configured to (i) sense differential pressure across a combustor during gas turbine engine operation and (ii) supply a differential pressure signal representative thereof; and
    a processor coupled to receive the differential pressure signal from the differential pressure sensor and configured, upon receipt thereof, to determine an amount of sand plugging of combustor cooling holes.

2. The system of claim 1, further comprising:
    a pressure sensor configured to sense combustor inlet pressure and supply an inlet pressure signal representative thereof,
    wherein the processor is further coupled to receive the inlet pressure signal and is further configured to correct the sensed differential pressure based on the sensed inlet pressure.

3. The system of claim 1, further comprising:
a temperature sensor configured to sense (i) exit temperature of a gas turbine engine during gas turbine engine operation and (ii) supply a temperature signal representative thereof,
wherein the processor is further coupled to receive the temperature signal and is further configured, upon receipt thereof, to assess gas turbine engine component health based on the sensed differential pressure and the sensed exit temperature.

4. The system of claim 1, wherein the processor is further configured to generate an alert signal when the amount of sand plugging exceeds a predetermined threshold.

5. The system of claim 4, further comprising:
an alert device coupled to receive the alert signal and configured, upon receipt thereof, to generate an alert.

6. The system of claim 5, wherein the alert device is configured to generate one or more of an audible alert, a visual alert, and a haptic alert.

7. The system of claim 1, wherein the processor is further configured to transmit the amount of sand plugging of the combustor cooling holes to a remote device.

8. A gas turbine engine system, comprising:
a gas turbine engine including a compressor, a combustor, and a turbine disposed in within a turbine housing, the combustor disposed downstream of the compressor and defining a combustor inlet plenum, the combustor including a combustion chamber and a plurality of combustor cooling holes that provide fluid communication between the combustor inlet plenum and the combustion chamber;
a differential pressure sensor coupled to the combustor, the differential pressure sensor configured to (i) sense differential pressure between the combustor inlet plenum and the combustion chamber and (ii) supply a differential pressure signal representative thereof; and
a processor coupled to receive the differential pressure signal from the differential pressure sensor and configured, upon receipt thereof, to determine an amount of sand plugging of the combustor cooling holes.

9. The system of claim 8, further comprising:
a pressure sensor disposed within the combustor inlet plenum, the pressure sensor configured to sense combustor inlet pressure and supply an inlet pressure signal representative thereof,
wherein the processor is further coupled to receive the inlet pressure signal and is further configured to correct the sensed differential pressure based on the sensed inlet pressure.

10. The system of claim 8, further comprising:
a temperature sensor configured to sense gas turbine engine exit temperature and supply a temperature signal representative thereof,
wherein the processor is further coupled to receive the temperature signal and is further configured, upon receipt thereof, to assess gas turbine engine component health based on the sensed differential pressure and the sensed exit temperature.

11. The system of claim 8, wherein the processor is further configured to generate an alert signal when the amount of sand plugging exceeds a predetermined threshold.

12. The system of claim 11, further comprising:
an alert device coupled to receive the alert signal and configured, upon receipt thereof, to generate an alert.

13. The system of claim 12, wherein the alert device is configured to generate one or more of an audible alert, a visual alert, and a haptic alert.

14. The system of claim 8, wherein the processor is further configured to transmit the amount of sand plugging of the combustor cooling holes to a remote device.

15. A method of monitoring for sand plugging in a gas turbine engine, comprising:
sensing differential pressure across a combustor during engine operation;
processing the sensed differential pressure in a processor to determine an amount of sand plugging of combustor cooling holes; and
generating an alert, using the processor, when the amount of sand plugging exceeds a predetermined threshold.

16. The method of claim 15, wherein the step of sensing differential pressure comprises sensing the differential pressure between an inlet of the combustor and inside the combustor.

17. The method of claim 15, further comprising:
sensing inlet pressure at an inlet of the combustor; and
correcting the sensed differential pressure based on the sensed inlet pressure.

18. The method of claim 15, further comprising:
sensing exit temperature of the gas turbine engine during gas turbine engine operation; and
assessing gas turbine engine component health, in the processor, based on the sensed differential pressure and the sensed exit temperature.

* * * * *